April 14, 1931. T. L. VALERIUS 1,800,970
STORING AND DISPENSING APPARATUS
Filed Nov. 8, 1926 3 Sheets-Sheet 1
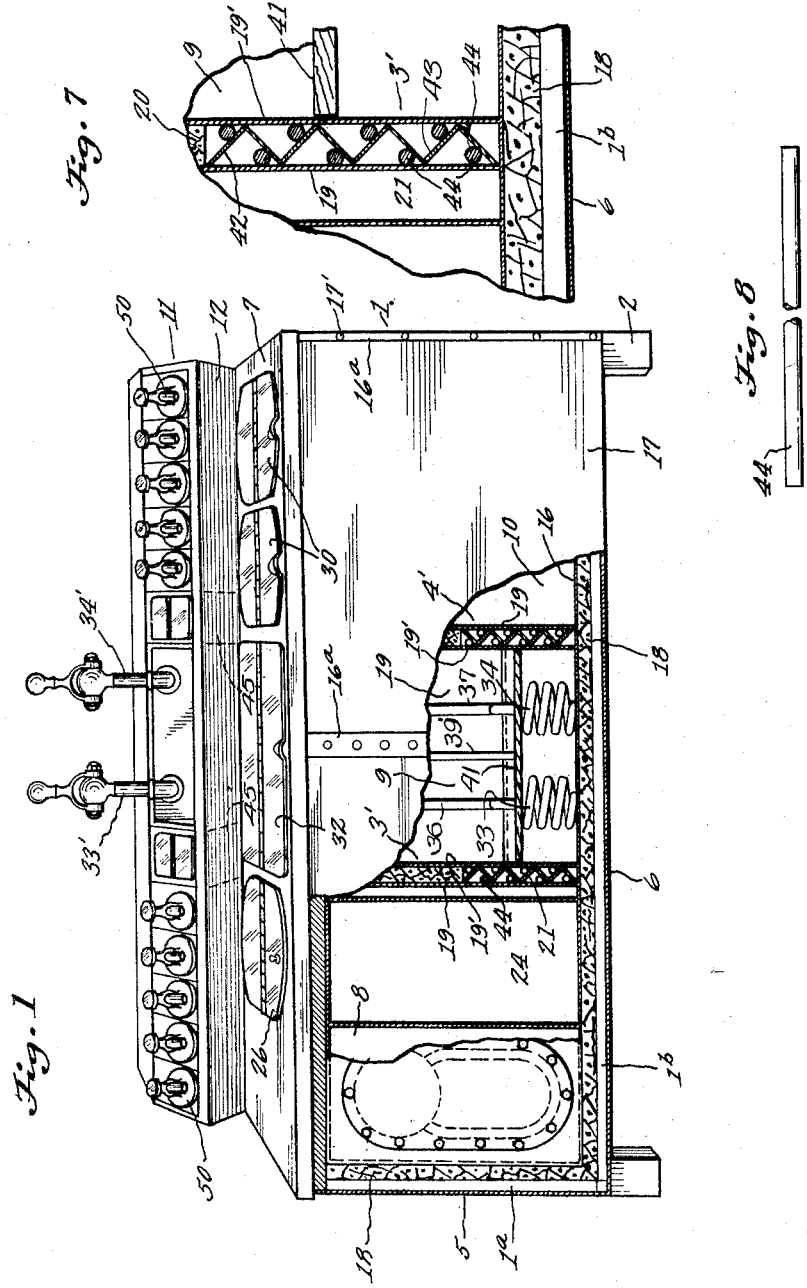
INVENTOR
Theodore R. Valerius
BY
ATTORNEY

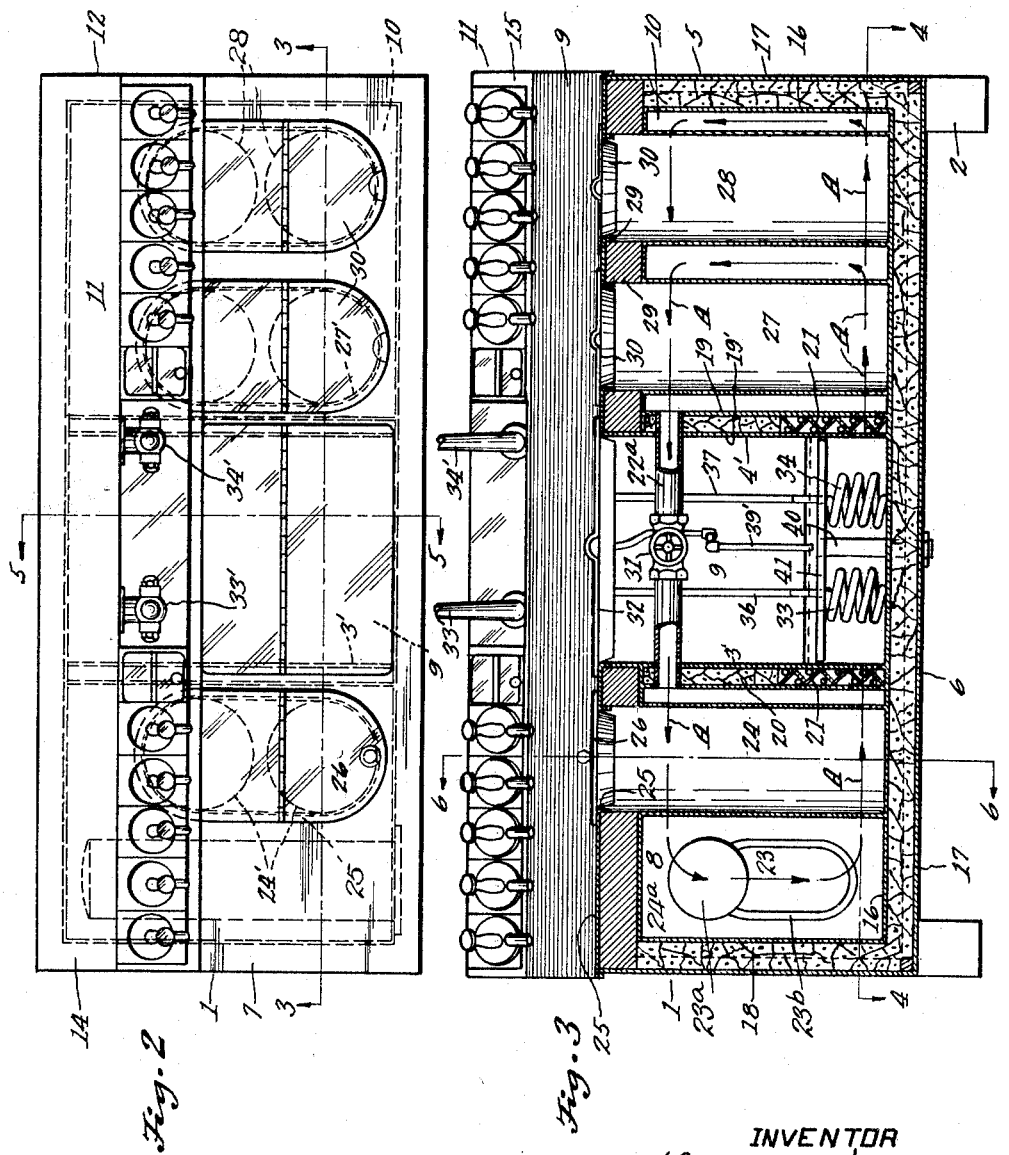

April 14, 1931.   T. L. VALERIUS   1,800,970
STORING AND DISPENSING APPARATUS
Filed Nov. 8, 1926   3 Sheets-Sheet 3
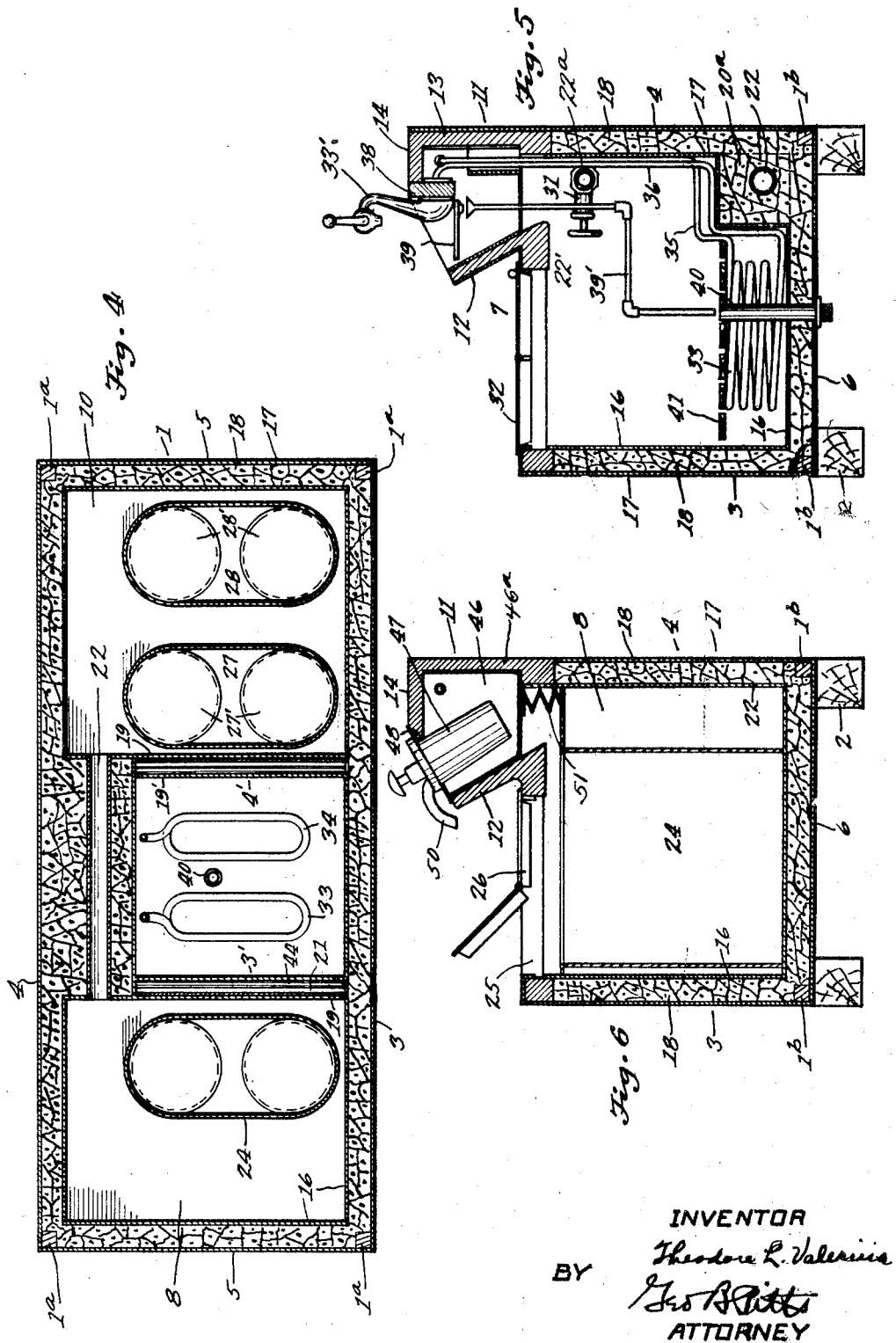
INVENTOR
Theodore L. Valerius
BY
ATTORNEY Patented Apr. 14, 1931

1,800,970

UNITED STATES PATENT OFFICE

THEODORE L. VALERIUS, OF MILWAUKEE, WISCONSIN, ASSIGNOR TO VALERIUS CORPORATION, OF JEFFERSON, WISCONSIN, A CORPORATION OF WISCONSIN

STORING AND DISPENSING APPARATUS

Application filed November 8, 1926. Serial No. 147,132.

This invention relates to an apparatus for storing foods, delicacies and beverages and for dispensing the same or permitting access thereto whereby they may be readily dispensed. More particularly, the invention relates to an apparatus having refrigerated compartments or spaces wherein different degrees of temperatures are maintained to the end that different kinds of food materials, delicacies and beverages may be stored and readily dispensed.

My improved apparatus has been applied for use in storing and dispensing frozen materials, such as ice cream, ices and sherbet in bulk and brick forms, bottled beverages and carbonated and other beverages adapted to be supplied from valved nozzles or draft arms and flavoring materials, as well as other materials for human consumption.

One object of the invention is to provide an apparatus of this character having a plurality of storing compartments refrigerated from a single source or means and maintained at different degrees of temperature dependent upon the character of the goods or materials to be stored and dispensed.

Another object of the invention is to provide in apparatus of this character having separate brine tanks containing storing compartments, an improved siphon system between them, whereby one compartment may be maintained at a degree of temperature lower than that of the other compartment and such temperature of the latter regulated and controlled to suit temperature changes exteriorly of the apparatus or the condition of the food material in the compartment.

Another object of the invention is to provide in apparatus of this character improved means for transferring the refrigeration effects from one compartment to another, whereby desirable temperatures may be maintained and controlled in compartments other than those immersed in the refrigerant.

A further object of the invention is to provide an apparatus of this character that is simple in construction and readily fabricated.

Other objects of the invention will be apparent to those skilled in the art to which my invention relates from the following description taken in connection with the accompanying drawings, wherein—

Fig. 1 is a front view of an apparatus embodying my invention, parts being broken away to facilitate the illustration.

Fig. 2 is a plan view of the apparatus.

Fig. 3 is a section on the line 3—3 of Fig. 2.

Fig. 4 is a section on the line 4—4 of Fig. 3.

Fig. 5 is a section on the line 5—5 of Fig. 2.

Fig. 6 is a section on the line 6—6 of Fig. 3.

Fig. 7 is a fragmentary section, being similar to parts shown in Fig. 1, but somewhat enlarged.

Fig. 8 is a detail view.

In the drawings, 1 indicates as an entirety a structure or casing mounted on suitable legs 2, having a front wall 3, a rear wall 4, end walls 5, a bottom 6 and a top 7. 3', 4', indicate spaced transverse partitions which cooperate with the front, rear and end walls to form compartments 8, 9 and 10 to which reference will later be made. The top 7, end walls 5 and rear wall 4 are constructed to support a casing or super-frame 11, having a front wall 12, a rear wall 13, a top wall 14 and end walls 15. The purpose of the casing 11 will later appear. The structure 1 may be constructed in any desired manner. As one example, I have shown it to include uprights 1a and sills 1b. Each of the walls 3, 4, 5, 6, and if desired the top 7 comprises an inner wall 16, an outer wall 17 and suitable insulating material (such as cork) 18 between them to prevent heat conduction through the wall. The inner wall 16 is formed from sheet stock that is preferably made from a suitable material incapable of rusting or being affected by brine; for example, copper, and the joints between sections of the sheet stock and along its corners are connected together in any suitable manner so that each compartment 8, 9, 10, is liquid tight and serves as a tank. The outer wall 17 is also formed from sheet stock and may be applied in sections and held in place by strips 16a, the latter being suitably secured in position by devices 17' (see Fig. 1). Each of the partitions 3', 4', comprises spaced walls 19, 19', preferably formed from the same material as the walls 16. A portion of the space between the walls 19, 19', form end to end thereof and from the top 7 downwardly any desired distance (for example, approximately three-fifths of the distance from the top 7 to the bottom wall 6) is filled with a suitable insulating material 20, preferably material similar to that between the walls 16, 17, and below the insulating material 20 I provide a heat conduction means, indicated as an entirety at 21, whereby the refrigeration effects of the refrigerant in the compartments 8 and 10 may be utilized to maintain a relatively low degree of temperature in the compartment 9 for purposes which will later appear. The conduction means 21 will be hereinafter described.

The walls 16, 17, 19, 19', are shown herein for illustrative purposes in a diagrammatic manner, since such walls may be formed in various ways. For example, each of the inner and outer walls forming the respective compartments may be formed in one piece; or two or more sections of material may be secured together and then positioned.

In carrying out any desired method, it is essential that all joints be made liquid tight since each of the compartments 8, 10, is filled with a refrigerant, preferably brine, and the compartment 9 is partially filled with water.

The lower portion of the sheet wall 16 on the inner face of the rear wall 4 is offset, as shown at 4a, between the partitions 3', 4', and the space formed by the offset is filled with insulating material 20a, preferably similar to the insulating material already referred to. As shown in Fig. 4 the lower inner portion of the walls 19' terminate at the offset, whereas the lower portion of the walls 19 extend to the wall 4 and thus form the end walls of the offset 4a. 22 indicates a pipe extending through the insulating material 20a and openings formed in the walls 19, to form a liquid connection between the compartment 8 and compartment 10, the pipe 22 forming part of a siphon system to be later referred to. By providing the insulated offset 4a, provision is made for insulating the pipe so that the temperature of the brine flowing from the compartment 8 to the compartment 10 will not be lowered before reaching the latter and the brine flowing through the pipe 22 will not affect the temperature of the air and materials in the compartment 9. By the arrangement shown, these advantages are attained and at the same time a direct connection from the compartment 8 to the compartment 10 is provided. 22a indicates a pipe connecting the upper portions of the compartments 8, 10, and serving as a return connection for the siphon system. As shown, the pipe 22a leads through suitable openings in the partitions 3', 4', and preferably extends through the compartment 9 so that access may be readily had to a regulating means 22' to which reference will later be made.

23 indicates an apparatus wherein a suitable refrigerating medium is expanded to effect refrigeration. The apparatus 23, commonly termed a boiler, is provided with a drum 23a and a series of coils 23b and is preferably immersed in the brine in the compartment 8. The boiler 23 is connected by piping with a condenser and a suitable compressor, whereby the medium is compressed and returned to the boiler. The compressor is operated by a suitable power means. The condenser, the compressor, the piping to and from the boiler and the power means are not shown. They may be of any desired construction.

24 indicates a chamber mounted in the compartment 8 in spaced relation to the walls thereof so that it may be entirely surrounded by the brine in the compartment. The side walls of the chamber 24 may be connected to the top wall 24a of the compartment 8, preferably in a liquid tight manner, to prevent the brine from leaking into the chamber. The chamber 24 registers with an opening 25 in the top 7 and such opening is provided with a suitable cover 26.

27, 28, indicate chambers preferably similar in construction to the chamber 24, both mounted in the compartment 10 in spaced relation to each other and the walls thereof so that each is surrounded by brine. As shown, the chambers 27, 28, register with openings 29 in the top 7 and these openings are provided with suitable covers 30. It will be understood that the walls of the chambers 24, 27 and 28, like the walls 16 and 17, are shown diagrammatically. Such walls may be formed from suitable material and connected in a fixed or detachable manner to the inner walls of the bottom 6 and top 7.

In one application of my invention, the chamber 24 is filled with ice cream packaged in brick form or receives cans 24' which are suitably filled with packaged ice cream, and the chambers 27, 28, receive cans 27', 28', containing ice cream in bulk form. As is well known, it is desirable to subject the ice cream in brick form to a relatively low temperature, approximately zero or 2 or 3 degrees below zero, whereas it is desirable to subject the ice cream in bulk form to a somewhat higher temperature, whereby it may be maintained in a conidtion which permits it to be readily dispensed, as by dipping it out with a spoon or scoop. At the same time it is advantageous to provide but one boiler in the apparatus, which will provide the maximum low degree of temperature in the compartment 8 and to control the temperature of the brine in the compartment 10 to secure the conditions just referred to. For this purpose, I provide a siphon system, comprising the pipe 22 connecting the lower portions of the compartments 8 and 10 and the pipe 22a which connects the upper portions of these compartments, which system permits the brine to flow from one compartment to the other, as indicated by the arrows A in Fig. 3, and in addition thereto I provide the pipe 22a with the regulating means 22' preferably comprising a valve 31 to control and regulate the flow of the brine through it, the operation of which will result in adjusting the temperature of the brine in the compartment 10 and thus regulate the hardness of the ice cream stored in the chambers 27, 28. That is, by opening the valve 31 and allowing the brine to freely flow through the pipe 22a the temperature of the brine in the compartment 10 is lowered; by adjusting the valve to throttle such flow, the temperature of the brine is raised. As already set forth, the pipe 22a extends through the compartment 9 and as this compartment is provided with a cover 32, access to the valve 31 is readily effected and since the valve 31 may be of any ordinary type, it may be adjusted in an easy manner. In this arrangement, the temperature of the brine in the compartment 10 is regulated and controlled independently of the temperature of the brine in the compartment 8 and independently of the power means and the various automatic controlling devices therefor and the boiler 23. In other words, the power means and its control devices may be set to automatically operate by the service engineer to maintain the desired refrigeration of the brine in the compartment 24, and by means of the regulating means 22' the user may adjust and regulate the temperature in the compartment 10 to suit varying conditions, for example, the temperature of the room in which the apparatus is installed and the relative hardness of the ice cream served to customers.

33, 34, indicate pipe coils disposed in the lower portion of the compartment 9. One end of the coil 33 is connected with the water service supply, shown at 35; its other end is connected by a pipe 36 with a suitable draft arm 33'. One end of the coil 34 is connected with a suitable supply of soda water; its other end is connected by a pipe 37 with a suitable draft arm 34'. Both draft arms 33', 34' are mounted in a wall 38, forming part of the casing 11, above a suitable drain 39, from which a waste pipe 39' extends, its discharge end being arranged to discharge the water into an outlet 40 extending through the bottom 6, leading to a suitable discharge means (not shown). 41 indicates a frame supported in the compartment 9, being preferably mounted on the coils 33, 34, and adapted to hold various materials, such as beverages in bottled form, butter and eggs, etc. The frame 41 is of open form for example, spaced strips suitably connected together. The compartment 9 is partially filled with water, preferably sufficient to immerse the major portion of the coils 33, 34.

The heat conduction means 21 is preferably disposed between the walls 19, 19', forming each of the partitions 3', 4', altho such means may be omitted from either partition when desired, where one such means is found sufficient. The conduction means extends upwardly from the bottom 6 any desired distance, but preferably to a point above the support 41. The heat conduction means 21 serves to transmit through the walls constituting the partitions 3', 4', sufficient refrigeration to lower the temperature of the materials stored in the compartment 9 to the desired degree and to maintain such degree of temperature as long as the apparatus is kept working. Each conduction means 21 is so constructed that the total thickness of the walls through which conduction is effected may be adjusted or varied, so that the temperature in the compartment will be suitable to keep the materials without affecting their condition or the packages containing them, and at a temperature suitable for consumption. As the heat conduction means in both partitions are of the same construction, the description of one will answer for both. Such means comprises a section of sheet metal 42 provided with corrugations 43 and fitted within and between the walls 19, 19', and preferably extending from the front wall 3 to a point coincident with the offset 4a (see Fig. 4), with the corrugations running horizontaly. The walls forming the corrugations may be plane surfaces disposed at angles to each other. The corrugated sheet 42 is slid into position through the front wall, the front end of the space being closed by the insulation material and the wall 17. In positioning the sheet, it is flexed or expanded slightly so that the crown edges of the corrugations will contact with the inner surfaces of the walls 19, 19'. However, due to distortion of the sheet 42 and walls 19, 19', it may be impossible to so arrange the corrugations 43 that their crown edges will make contact throughout their length with the walls 19, 19', and as a result the heat conduction will be diminished and it will be impossible to adequately remedy the defect. To overcome this condition, I removably mount in each of the spaces formed by the corrugations a round rod 44 substantially equal in length to the length of the sheet and preferably of solid material to make it relatively heavy. Each rod 44 is free to gravitate downwardly on the adjacent corrugated wall and become lodged against such wall and the adjacent wall 19 or 19', and thus form continuous contact therewith so that there is one or more metallic paths from the wall 19 to the wall 19' to transmit or conduct the temperature of the brine to the water and air in the compartment 9. Where the temperature of the water and air in the compartment 9 is lowered too much, then one or more rods 44 are removed, to reduce the total thickness of the metal paths through which conduction takes place. By increasing or decreasing the number of rods 44, the temperature of the compartment can be adjusted or controlled to suit varying conditions.

By preference the sheet 42 and rods 44 may be formed from a metal which has a relatively high coefficient of heat conduction; I have found by experience that a corrugated sheet formed from copper and rods formed from brass serves to conduct the heat in an efficient manner.

The casing 11 is provided with partitions forming chambers 45 for cracked ice and chambers 46 to receive fruit and syrup jars 47 (see Fig. 6). The jars 47 fit suitable openings 48 formed in the top 14. The upper ends of each jar is provided with a flange which rests on the top wall and each jar may be provided with a suitable dispensing means for effecting discharge of the flavoring material through its spout 50. The chambers 46 may be lined with suitable material 46a to make them liquid tight, so that they may be partially filled with water when desired.

I prefer to refrigerate the chambers 46 so as to keep the flavoring materials cold, for dispensing purposes, as well as to prevent them from spoiling. For this purpose the casing is opened along its bottom portion, or between the walls 12 and 13 to expose the bottom of the wall 46a to the relative low temperature of the spaces above the compartments 8, 10. To supplement this refrigerating effect, I prefer to position between each chamber 46 and the top wall of the adjacent compartment a section of suitable material 51, such as metal having a high co-efficient of heat conductivity, by means of which the relatively low temperature of the brine in the adjacent compartment is transmitted by conduction from the top wall of the compartment to the bottom wall of the chamber 46. The metal section 51 is removably mounted between these walls and if one such section is found insufficient to lower the temperature in the adjacent chamber 46, then I may use two or more sections of metal. By preference, the metal section 51 is corrugated, which permits it to be compressed, when positioned, so that it engages the walls with a spring tension. If desired, each chamber 46 may be filled with sufficient water to immerse a portion of the jars 47, the water thus serving as a medium through which the low temperature is conducted from the wall of the chamber to the jar to insure the desired cooling of the flavoring therein.

To those skilled in the art to which my invention relates many changes in construction and widely differing embodiments and applications of my invention will suggest themselves without departing from the spirit and scope thereof. My disclosures and the description herein are purely illustrative and are not intended to be in any sense limiting.

What I claim is:

1. In apparatus of the class described, the combination of a pair of compartments for containing a refrigerated medium, an intermediate compartment, means in one of the first mentioned compartments for refrigerating the medium therein, a thermo-siphonic system between said first mentioned compartments, said system comprising upper and lower pipes connected to the upper and lower portions respectively of said compartments, one of said pipes being insulated and the other pipe extending through said intermediate compartment, and means in the last mentioned pipe for controlling the flow of the medium therethrough.

2. In apparatus of the class described, the combination of a pair of compartments for containing a refrigerated medium, an intermediate compartment, means in one of the first mentioned compartments for refrigerating the medium therein, a thermo-siphonic system comprising pipes connecting the lower and upper portions respectively of said first mentioned compartments, the upper pipe extending through the intermediate compartment and provided with a regulating device, and means for insulating the pipe between the lower portions of said compartments.

3. In apparatus of the class described, the combination of a casing having a dividing partition to provide compartments, said partition comprising walls spaced from each other, portions of the opposed surfaces of said walls being exposed, and a section of metal between said walls and shaped so that portions of the metal engage the exposed portions of the walls.

4. An apparatus as claimed in claim 3 in which said section of metal is corrugated.

5. An apparatus as claimed in claim 3 in which said section of metal is corrugated and devices for transferring heat are mounted in the corrugations.

6. In apparatus of the class described, the combination of a pair of compartments, the partition between said compartments comprising spaced walls, a temperature changing medium in one compartment, a section of corrugated material between said spaced walls, and devices in certain of the spaces formed by the corrugations and arranged to effect contact between said partition walls and said section of material.

7. An apparatus as claimed in claim 6 in which the corrugations extend horizontally and said devices comprise rounded members.

8. In apparatus of the class described, the combination of a frame containing compartments side by side and a casing above them and shaped to form a chamber, dispensing devices mounted in said chamber, a refrigerated medium in one of said compartments, means disposed in the wall between said compartments serving as a conduction wall to effect refrigeration in the other compartment, and a section of heat conduction material between the top wall of the medium containing compartment and the bottom wall of said chamber.

9. An apparatus as claimed in claim 8 in which said section of material is expansible.

10. In apparatus of the class described, the combination of two compartments having their adjacent side walls in spaced relation, a section of metal having horizontally extending corrugations between said side walls, and devices in the spaces formed by said corrugations and arranged to gravitate downwardly thereon so as to normally contact with the metal of said section and the adjacent side wall.

In testimony whereof, I have hereunto subscribed my name.

THEODORE L. VALERIUS.